United States Patent [19]

Bily

[11] 4,277,503
[45] Jul. 7, 1981

[54] ADDITION OF LECITHIN TO INCREASE YIELD OF CHEESE

[76] Inventor: Robert R. Bily, P.O. Box 3637, San Jose, Calif. 95156

[21] Appl. No.: 86,672

[22] Filed: Oct. 19, 1979

[51] Int. Cl.³ .............................................. A23C 19/02
[52] U.S. Cl. ..................................... 426/40; 426/582; 426/662
[58] Field of Search ................... 426/36, 40, 580, 582, 426/588, 662

[56] References Cited

U.S. PATENT DOCUMENTS

| 3,278,310 | 10/1966 | Williams et al. | 426/588 |
| 4,066,791 | 1/1978 | Corbin, Jr. | 426/588 X |

FOREIGN PATENT DOCUMENTS

| 10745 | 1/1933 | Australia . |
| 2807853 | 1/1979 | Netherlands . |

OTHER PUBLICATIONS

Kosikowski, F., Cheese and Fermented Milk Foods, Published by the Author, Ithaca, N.Y., 1966, (pp. 88, 91-95 and 384-386), SF271K6.

Primary Examiner—David M. Naff
Attorney, Agent, or Firm—Robert H. Eckhoff

[57] ABSTRACT

A method for increasing the yield of cheese from milk involving the adding of lecithin in an amount of 0.001% to 0.15% to the milk prior to the coagulation or the precipitation of any curd in the milk.

4 Claims, No Drawings

ADDITION OF LECITHIN TO INCREASE YIELD OF CHEESE

BACKGROUND OF THE INVENTION

In the manufacture of cheese, it is important to control the process so as to yield as much cheese as possible from the milk. One of the obvious advantages derived from the increased yield is the lower cost for the manufacture of the cheese. Obviously, the more cheese derived from the raw material, the less expensive it is to manufacture the cheese.

Another advantage gained from increased yield relates to the disposal of the whey which is left after the cheese is formed. This byproduct is one for which few uses have been found and therefore is frequently disposed of through the sewage waste system. With increased yield from the milk, less whey is formed with a resulting reduction in pollution to our environment.

Whey is the serum or watery part of milk that separates from the curds in the process of making cheese. It is the largest byproduct of the huge dairy industry and is one of the most troublesome byproducts produced by any industry to the extent that it is now having considerable impact on economic and environmental affairs. The unused organic nutrients make whey a costly pollutant in the nation's sewage systems and waterways. Biological oxyen demand (BOD) values for cottage cheese wheys range from 30,000 to 45,000 milligrams per liter. A load of 1,000 gallons of raw whey discharged into a sewage treatment plant has been calculated to equal the load normally imposed by 1,800 people. Because BOD removal is usually not completed in the sewage treatment plants, this hugely oxygen-demanding effluent is partially passed into rivers and streams. Every 1,000 gallons of raw whey discharged into a stream requires the dissolved oxygen in over 4,500,000 gallons of water for its oxidation. Obviously, disposing of whey direction into a water system is very detrimental of the environment.

Whey can be processed by spray or roller-drying and by using membrane technology. Other methods of handling whey involve using it as animal food or fertilizer, but these processes have not been successful at this time.

It is the purpose of the present invention to increase the yield of cheese from milk and thereby reduce the amount of whey waste while not adversely affecting the taste and edibility of the cheese.

SUMMARY OF THE INVENTION

In the manufacture of cheese, a method is disclosed for increasing the yield over conventional practices by the addition of lecithin to the milk used in making the cheese, preferably in quantities of 0.001 percent to 0.066 percent by weight of the milk used in making the cheese. The lecithin is added to the prepared milk prior to coagulation or precipitation of the curd. Lecithin is a natural mixture of phosopholipids or phosphatides derived from vegetable or animal sources and, as normally used in commerce today, is the phospholipid complex derived from soybeans.

DESCRIPTION OF THE INVENTION

There are a number of steps followed during the cheese production process. Conventionally, milk is placed in a vat and heated to an appropriate temperature. A starter is added to ripen the milk and after an appropriate time, rennet extract, or any of the milk-coagulating catalysts, is mixed in to initiate the coagulation process unless the milk is set with starter only. The amount of milk, starter and rennet extract or coagulating catalyst is closely controlled as are many other ingredients which are added for various purposes. The resulting mixture is allowed to remain quiet until a curd forms. The curd is then cut and cooked prior to draining or dipping, knitting, salting, pressing and any special applications. The above process is that conventionally followed in the manufacture of most cheeses but other methods can and do apply.

After coagulation, the cheese is separated from the whey, leaving the whey as a byproduct. A conventional commercial process for making cheese will involve 41,796 pounds of milk from which will be derived 3,406 pounds of cheese in a normal yield. The remainder is a byproduct of the process known as whey which usually is discarded. One problem facing the industry is the disposal of the whey since it comprises a substantial bulk to be carried away in normal sewage. Of course, if this manner of disposal is used, further pollution of the enivronment can result; therefore, any reduction in the amount of waste material is significant. Any increase in yield of cheese from a predetermined amount of milk is also significant since the increased yield results directly in lower costs to the consumer.

It has been found that the addition of lecithin increases the yield of cheese from a standard quantity of milk. Testing has further shown that the quantity of lecithin added is critical, that is—the amount added must be closely controlled. If too little lecithin is added, the increase in yield of cheese is less. If too much lecithin is added, there results a degradation in the quality of the cheese, especially as to taste and texture.

In practicing the present invention there is added to the milk a predetermined quantity of lecithin to increase the yield of cheese from a given quantity of milk. The average increase in yield will vary depending upon the yield characteristics of the cheese being manufactured. These yield characteristics are determined by the percentage of fat and moisture in the finished cheese. Higher fat cheeses and higher moisture cheeses yield greater quantities of cheese from similar quantities of milk than do lower fat cheeses and lower moisture cheeses. Obviously, it is understood here that higher fat cheeses are made from higher fat milk even though the quantity of milk in gallons is similar to lower fat milk used for lower fat cheeses. When lecithin is added to milk that will be used for higher fat and/or higher moisture cheeses prior to coagulation, the percentage increase in yield will be greater than if the same quantity of lecithin had been added to the same quantity of milk that was used for lower fat and/or lower moisture cheeses. In short, cheeses that are higher yielding to begin with display the largest increases in percentage of yield when lecithin is added to the milk prior to coagulation of the curd. Therefore, a cheese that yields normally 9 percent in cheese has been proven to yield 9.35 percent in cheese with lecithin; a cheese that yields at 11 percent in cheese normally has yielded at 11.6 percent in cheese with lecithin and a cheese that yields at 15 percent normally will yield 16.5 percent in cheese with lecithin. The increase in yield for cheese made with the addition of lecithin to the milk prior to coagulation of the curd is generally between 3 percent and 10 percent.

The lecithin used is a natural mixture of phosopholipids or phosphatides and it can be derived from vegetable or animal sources. The lecithin that was used in the examples given was pure oil-free powdered lecithin derived from soybeans. Attempts were made to use liquid lecithin but this product does not mix well with milk, possibly due to the high soy oil content remaining with the lecithin. It is possible to use liquid lecithin but the process is very messy, difficult to control and results in large quantities of wasted lecithin.

The addition of lecithin to cheese after curd formation has been known in the past but the addition has not been for the purpose of increasing the yield or reducing the quantity of whey evolved in the cheese-making operation. Thus, in Australian Pat. No. 10,745/33 lecithin is added to cheese after it has been formed to reduce cracks, cleavages and excessively large pores. Thus, it is said in that patent that: "The addition of lecithin according to the invention causes whole milk (varieties of cheese) and in skimmed milk varieties of cheese an homogenisation and the products show a smooth cut surface, a uniform porosity, no 'blowing' and thus have a high market value." Furthermore, lecithin addition to milk without precise control of this quantity can adversely effect the quality of the cheese to the point where the cheese is unpalatable. The amount of lecithin added to the milk is found to be critical both from the standpoint of increasing the yield and preventing undesirable side effects in the cheese. Good results overall are obtained by adding between 0.001 percent to 0.066 percent of lecithin by weight to the milk. As the amount of lecithin is increased from 0.001 percent to 0.045 percent, a progressively higher yield of cheese from a predetermined amount of milk is attained without undesirable side effects. Yield increases without negative side effects are maximized in the range of 0.045 percent to 0.066 percent of lecithin added to the weight of the milk. Within this latter range, the maximum cheese yield was obtained without adverse effects to the cheese. It was found that cheese with higher fat gave slightly better yields with lecithin in the higher end of the range, i.e. 0.066 percent, while cheese of lower fat responded optimally with the addition of lecithin in the lower end of the range, i.e. 0.045 percent.

Increasing the amount of lecithin above 0.066 percent to 0.15 percent by weight continued to increase the cheese yield in most instances but the cheese products suffered adverse side effects. For instance, most cheeses produced at these higher lecithin percentages exhibited an off-flavor quality and were extremely soft in body and texture. In some cheeses the greater amounts of lecithin added resulted in some lecithin separating from the other ingredients of the cheese and pooling at the bottom of the cheese form to render the cheese useless.

Some cheese varieties made with lecithin added in the range of 0.15 percent by weight have been allowed to age to determine if the adverse flavor in the cheese disappeared. Such tests have shown that the adverse flavor defects did not disappear in most cheeses. However, sharper tasting cheeses developed an interesting and possibly acceptable flavor, although different from what is normally expected. In most cheeses the body and texture obtained with these higher amounts of lecithin were progressively more difficult to control. However, cheeses of low moisture were made effectively. Some cheeses were manufactured with the addition off lecithin in the amount of 0.175 percent by weight but these cheeses were without body and texture. Furthermore, the value of the cheese from the further increased yield obtained with the addition of lecithin in the range of 0.066 percent to 0.15 percent was not significantly greater than the cost of the addition lecithin added to the process. In other words, a point of diminishing return was realized beyond 0.066 percent. Therefore, it is concluded that the adding of lecithin above the range of 0.045 percent to 0.066 percent does not significantly and profitably increase the cheese yield above that attained when lecithin is used within that range and will in most instances result in adverse flavor defects. However, lecithin may be added in the range of 0.066 percent to 0.15 percent prior to curd formation if flavor and/or texture is not of critical importance, i.e. for cheese that will be further processed, flavored or mixed with other ingredients.

To increase cheese yield, the lecithin must be added prior to the coagulation of the milk into cheese curd. Most cheeses of the world are formed from one of three distinct curd precipitation patterns. In soft acid cheese such as cottage or cream, precipitation occurs at room temperature in 5 to 16 hours as a result of an acid, usually lactic, exerting an effect on the casein. For cheese such as swiss, cheddar or mozzarella, precipitation occurs at elevated room temperature in 30–45 minutes as a result of rennin action (or suitable substitutes for rennin). A third precipitation form, restricted mainly to ricotta cheese, utilizes a combination of high heat and medium acidity, ph 6.0 to partly dehydrate protein particles and precipitate the curd.

The following sets forth the procedures followed and the results obtained in some of the testing conducted. In the preparation of part skim low moisture mozzarella cheese, vat one was the control vat and vat two was the vat containing lecithin. Milk for both vats was drawn from the same holding tank. The milk was pasteurized at 161.6° F. for 16 seconds, cooled to 90° F. and pumped into identical Damrow Double O vats. Samples of milk were tested for the percentage of fat, percentage of protein and percentage of total solids. In this particular test, milk in vat one was found to contain 1.77 percent fat, 3.15 percent protein and 10.54 percent total solids. The milk in vat two was found to contain 1.78 percent fat, 3.10 percent protein and 10.44 percent total solids. Since this milk had not been homogenized, slight variations in lab analysis are to be expected in different samples taken from the same holding tank, although these milks are considered similar for production purposes.

Vat one was filled with 4,860 gallons of pasteurized milk and at one gallon of milk to equal 8.6#, this equates to 41,796# of milk. After 15 minutes, 140 gallons of bulk starter were added to vat one. Forty minutes later, the milk was ready for the addition of a milk coagulating catalyst. In this instance 5 gallons of a diluted microbial enzeyme—mucor miehei—was mixed in a ratio of 68 ounces of microbial enzyme to 5 gallons of water. The milk was agitated for 5 minutes and the vat covered. After 30 minutes the curd in vat one was cut and allowed to remain undisturbed in the whey for approximately 15 minutes with only periodic gentle agitation. The curd was then cooked to 110° in 35 minutes while using slow mechanical agitation through much of the cooking period. The curds and whey were pumped onto an automatic Damrow DMC belt where the curd was drained, matted and cheddared prior to being mechanically stretched in a cooker/molder manufactured by the Stainless Steel Fabricating Company.

The cheese curd was carefully segregated throughout these processes to guarantee that the curd from the control vat was isolated at all times. When the curd blocks were properly acid-ripened, they were milled (cheddared) and mechanically stretched in heated water at a temperature of 170° F. The cheese was then removed from the molder in 5# loaves and placed in stainless steel forms to coalesce. The forms were then placed in cold water until the body was firm and the cheese was then removed from these forms and placed in brine tanks for proper salting. After the curd from vat one had all been removed from the DMC belt, the cooker/molder machines were broken down to remove all remaining curd left inside this equipment. This cheese was then processed as before and added to the rest of the cheese from vat one. All cheese from vat one was carefully segregated in its own brine tank and allowed to cure for the specified amount of time. This cheese was then packaged, boxed and weighed and the weight of the finished cheese from control vat one was 3,406 pounds. The cheese was then placed under refrigeration at 40° F. for later testing.

Vat two was started filling while vat one was filling. Seventeen and one-half pounds of pure powdered lecithin were mixed slowly into a small body of milk that was being run through a reciprocal pump under strong pressure until the lecithin was thoroughly incorporated into the milk. The mixture was then pumped into vat two for further mixing with the main body of milk. Vat two continued to fill to 4,860 gallons or 41,796 pounds of milk. The percentage of lecithin in the milk equaled approximately 0.042 percent. After 15 minutes 140 gallons of starter were added and 35 minutes later 5 gallons of the diluted milk coagulating enzyme, mucor miehei was added. The batch was cut after 30 minutes and all procedures described for the control vat one were followed in an identical manner. A higher yield of 3,528 pounds representing an increased yield of 3.58 percent over that obtained from vat one was obtained.

Samples of cheese from vats one and two were later tested for percentage of fat, moisture, total solids, pH and percentage of protein. The cheeses from vats one and two were similar in percentage of moisture, total solids, pH and percentage of protein but there was a consistent dissimilarity in percentages of fat between vats one and two.

An analysis showed the following results:

| Sample Cheese From Vat One | | Sample Cheese From Vat Two | |
| Without Lecithin | | With Lecithin Added | |
| --- | --- | --- | --- |
| % Fat | 16.47 | % Fat | 15.39 |
| % Fat Dry Basis | 32.83 | % Fat Dry Basis | 30.51 |
| % Total Solids | 50.17 | % Total Solids | 50.45 |
| % Moisture | 49.83 | % Moisture | 49.55 |
| pH | 05.40 | pH | 05.40 |
| % Protein | 27.85 | % Protein | 28.18 |

Several cheese samples were tested from vats one and two and all were found to have substantially the same levels. No explanation was reached for the lower percentage of fat in the samples made with lecithin. Since milk coagulation involves the precipitation of milk protein, colloidal chemistry is obviously involved. Cheese yield is dependent upon the recovery of fat and casein by the curd during cheesemaking and by the composition of the milk and the moisture content of the final cheese. Since lecithin is a valuable colloid, emulsifier and water binder, it is understandable that it can affect cheese yield.

In subsequent tests these results were repeated. All vats of milk with lecithin added prior to coagulation of the cheese curd provided greater yields than those vats lacking addition of lecithin. Also, tests of a similar nature were run in another cheese factory with similar results.

In another test, two vats of cottage cheese were made. In this skim milk was fortified with low heat extra grade skim milk powder to a level of 11 percent total solids. One-half of the batch was used as a control and to the other half was added 0.045 percent lecithin powder. The batches were set and, after they reached the proper acidity, the curd was cut and cooked. The whey was then drained off, the curd was washed and drained and the drained curd was then weighed for each vat.

The sample with lecithin produced more cheese curd than the control. The yield was determined by dividing the weight of the finished curd by the weight of the solids in the milk. The yield for the control vat was equal to 1.74. The yield for the lecithin vat was equal to 1.91. Samples were tested for percentage of moisture, percentage of fat, percentage of total solids, percentage of protein and pH. The results were the same for cheese made with or without lecithin. Due to the high moisture and low fat characteristics of cottage cheese, the dissimilarity in percentage of fat between cottage cheese with lecithin and without lecithin was not apparent.

Other tests confirmed these results. In some of the tests the milk with lecithin was pasteurized and homogenized to guarantee full incorporation of the lecithin with the milk. With this second procedure the skim milk was adjusted to 11 percent total solids and split into two batches. The control batch was pasteurized and homogenized at 2500 lbs/sq. inch. The batch with lecithin added in the amount of 0.045 percent was pasteurized and homogenized after the addition of the lecithin. The cheesemaking process was followed exactly as described before and the yield for the batch with lecithin was again higher than the control.

In these tests representative yields were as follows: The yield for the control batch was equal to 1.71. The yield for the batch with lecithin was equal to 1.87. The percentage increase in yield for vats of these cheeses made with the addition of lecithin prior to the precipitation of curd averaged approximatley 9.57 percent higher than cheeses made without the addition of lecithin.

All cheese samples made in all cheese factories were tested by a flavor panel. There was found to be no significant difference between the products that had lecithin and those that did not. These cheeses were tested at room temperature and also directly not of refrigeration. Cheeses such as mozzarella that were heated on top of a pizza crust exhibited better flavor with lecithin than without. Furthermore, cheeses used in cooking exhibited better melting characteristics and resistance to browning. It was also found that the lecithin cheeses could be frozen and thawed without the usual resultant moisture loss. The flavor is preserved during cooking or freezing by the addition of lecithin because moisture loss is reduced and flavor loss is oftentimes related to moisture loss.

In all experiments conducted, the resultant whey remaining after the curd had formed did possess a lecithin flavor and feel. The whey was very smooth to the touch. These attributes were indicative that not all the lecithin is absorbed by the cheese curd although no tests have determined the amount of lecithin remaining in the whey after the cheesemaking process.

One key to the process of this invention is that the amount of lecithin specified must be added to the milk prior to the precipitation of the curd regardless of what method is used to precipitate the curd if a greater than normal yield is to be attained. In summation, the lecithin can be added to the milk used for cheesemaking when the milk is in its raw state prior to pasteurization and/or homogenization, or the lecithin can be added to the milk after it has been prepared with starter but prior to precipitation of the curd. The lecithin can also be added to the milk at any point between its raw state and the point at which said milk precipitates into cheese curd.

Other positive effects realized from the addition of the lecithin to the cheese in the predescribed ranges have involved superior melting characteristics in the cheese, a better taste and increased nutritional value. In addition the cheese with the specified amounts of lecithin added has been generally easier to slice, separate, grate, dice and grind and also has exhibited increased shelf life and improved freezability qualities. For instance, it is known that when conventional cheese is frozen, the product suffers from the effects of dehydration so as to change the overall texture of the cheese. The addition of lecithin to the cheese has reduced such dehydration and therefore has helped maintain the basic characteristics of the cheese both before and after freezing.

This invention reduces the production of raw whey by increasing the yield of cheese. In so doing, more cheese is produced from a given quantity of milk and energy used; therefore, more cheese is produced from the same amount of energy consumed. This too is of significant importance because the manufacture of cheese requires a substantial amount of energy. Furthermore, since raw whey does require such a large amount of pure water to reduce its BOD, any reduction in whey production is a significant factor in improving the environment. Currently there are an estimated 35.8 billion pounds of fluid whey available for processing in the United States and as estimated total of 70 billion pounds of whey available worldwide. With an average decrease of whey production in the amount of 1 percent which is possible with this invention, whey production could be decreased by 358 million pounds in this country and 700 million pounds worldwide.

The invention claimed:

1. A process for producing cheese from milk wherein increased yield of cheese is obtained comprising mixing lecithin with liquid milk in an amount of from 0.001 percent to 0.15 percent by weight of the liquid milk prior to any coagulation of the milk, coagulating said liquid milk containing lecithin admixed therein to form solid curd and liquid whey, separating the curd and whey, and reccovering the curd from the whey.

2. A process as in claim 1 wherein the mixture of liquid milk and lecithin is homogenized before curd formation.

3. A process as in claim 1 wherein the mixture of liquid milk and lecithin is pasteurized before curd formation.

4. A process as in claim 1 wherein the lecithin is in the form of powder which is substantially oil free.

* * * * *